CROSS REFERENCE SEARCH ROOM

INFORMATION RETRIEVAL FROM SYMBOLS BASED ON PRESENCE AND ABSENCE OF CODING COMPONENTS, THE INFORMATION BEING RETRIEVED IN DISCRETE ELECTRICAL PULSES

Filed May 18, 1966

INVENTOR.
RAYMOND JOHN DUNSFORD SMITH
BY
Samuel Branch Walker
ATTORNEY 3,492,478

INFORMATION RETRIEVAL FROM SYMBOLS BASED ON PRESENCE AND ABSENCE OF CODING COMPONENTS, THE INFORMATION BEING RETRIEVED IN DISCRETE ELECTRICAL PULSES

Raymond John Dunsford Smith, Bethel, Conn., assignor to American Cyanamid Company, Stamford, Conn., a corporation of Maine Filed May 18, 1966, Ser. No. 551,037
Int. Cl. H01j 1/62
U.S. Cl. 250—71 1 Claim

ABSTRACT OF THE DISCLOSURE

Symbols coded in inks, the coding being by presence or absence of photoluminescent material, are read out by sequentially in pressing on a detector radiation corresponding to the narrow bands of fluorescent light of various components. This results in the production of electical pulses corresponding to particular components separated discretely in time. The pulses are then processed in conventional circuits to give a readout of the particular symbol. Provision is also made for generating a marker pulse, for example electro-optically, so that the start of a train of pulses corresponding to a single symbol is marked. Also, ambient or stray light is kept from the detector to the extent that it does not produce responses above the threshold responses for the presence or absence of coded components.

In the application of Freeman and Halverson Ser. No. 596,366, filed Oct. 14, 1966, which is a continuation-in-part of the Freeman and Halverson application, Ser. No. 437,866, filed Mar. 8, 1965, now abandoned, there is described a method of encoding and decoding using fluorescent inks, each component fluorescing at at least one wavelength at which the other components do not fluoresce. The code depends on the presence or absence of particular components or, under certain circumstances, different levels of fluorescence of any particular component. The Freeman and Halverson application describes a number of fluorescent or photoluminescent materials suitable for components of coded inks, and in a more specific aspect prefers that at least some or all of the components be narrow band fluorescent materials constituting chelates of lanthanide ions, preferably associated with so-called synergic agents, which reduce or shield against non-luminous energy transfers of excited ions when the coded ink is illuminated with a suitable short wave radiation, such as ultraviolet light. For many purposes multiple fluorescence detectors or sensors are used, one for each component of the coded ink.

SUMMARY OF THE INVENTION

The present invention is directed to a simplified and improved method of reading out coded ink symbols or messages and requires only a single fluorescence detector. The invention also includes simplified electronic circuitry for decoding. The simplification of the readout mechanism is obtained without deleterious effect on the speed of readout and presents advantages in discrimination against spurious signals. In other words, readouts with high signal to noise ratio are made possible.

According to the present invention coded symbols, whether of arbitrary shape or recognizable shape, are moved to reading position and illuminated with short wave radiation, such as ultraviolet light, the resulting fluorescent radiation is imaged on a longer wavelength detector which is capable of responding to at least a portion of the wavelength band in the fluorescence from each component of the coded ink. Ordinarily most of the different fluorescent bands are in the visible, but there are some materials, such as certain chelated lanthanide ions, which fluoresce in the near infrared. Sensitive radiation detectors, such as photocells, photomultipliers and the like, are available, some of which respond to radiations in the near infrared. Means are provided to prevent stray light from striking the fluorescence detector and preferably include the provision of a suitable narrow aperture or apertures in the beam from the illuminated coded symbol to the fluorescence detector.

In the beam there are, preferably, successively interposed narrow bandpass filters, such as for example interference filters, which pass bands each one uniquely including radiation from only one photoluminescent component of the coded ink. In its broader aspects the present invention is not limited to the exact mechanical design of the mechanism for successive interposition of filters, and ordinary filter wheels may be used. There will be described below in more detail a modification in which the filters form the sides of a drum which has certain advantages and which may be considered in some respects as a preferred form of the invention. In any event, filter wheels or other mechanisms of similar type can be turned rapidly so that different filters can be interposed at extremely short intervals.

The electronics portion of the present invention receives a signal from the fluorescence detector in the form of a series of pulses at certain points in the repetitive pulse train corresponding to the presence of particular components. It is also necessary to indicate the start of a particular filter sequence to provide synchronization by a suitable marker pulse, which may be produced by any suitable means whether by electrical or electro-optical or other means. The train of pulses can be displayed in successive lines on a long persistence phosphor oscilloscope or other display means, or the pulse train can be analyzed by suitable pulse analyzers to give signals of the different symbols. The circuits interpreting the pulse trains are well known in the electronics art and their exact electrical nature forms no part of the present invention, which merely requires that there be some readout interpreting the electrical pulse trains as different symbols.

The start of a particular sequence of filters which is needed each time a coded symbol is being read may produce a marker pulse which is easily recognizable from the other pulses. In the specific description which will follow the pulse is shown to be much greater in amplitude than any of the other pulses, but the invention is not limited to identification by amplitude and any other form of identification of the synchronizing pulse may be used.

Use of an output in the form of pulse train has the important advantage that such types of signals can be interpreted electronically with an extraordinarily high degree of signal to noise ratio, which is one of the important practical advantages of the present invention. Where components may be present in more than one level, for example absent, present at low level and present at a higher level, as is described in the Freeman and Halverson application, the pulses of course would be of different amplitudes. The advantages of good signal to noise ratio which is inherent in pulse train signals is retained, although of course not to quite so high a degree as when there are only two levels, that is presence or absence of a component.

DESCRIPTION OF THE PREFERRED EMBODIMENTS

The coded dot is shown at 1 and it moves into ultraviolet illumination, which is shown diagrammatically by the beam 2. The illustrated code is one having six components, which permits 63 different symbols when presence or absence of a component forms the code, the formula of course being $2^n - 1$, where $n$ is the number of different components. If there is a code with components appearing in more than one level, for example two levels, the formula of course is $3^n - 1$.

Figure 1:
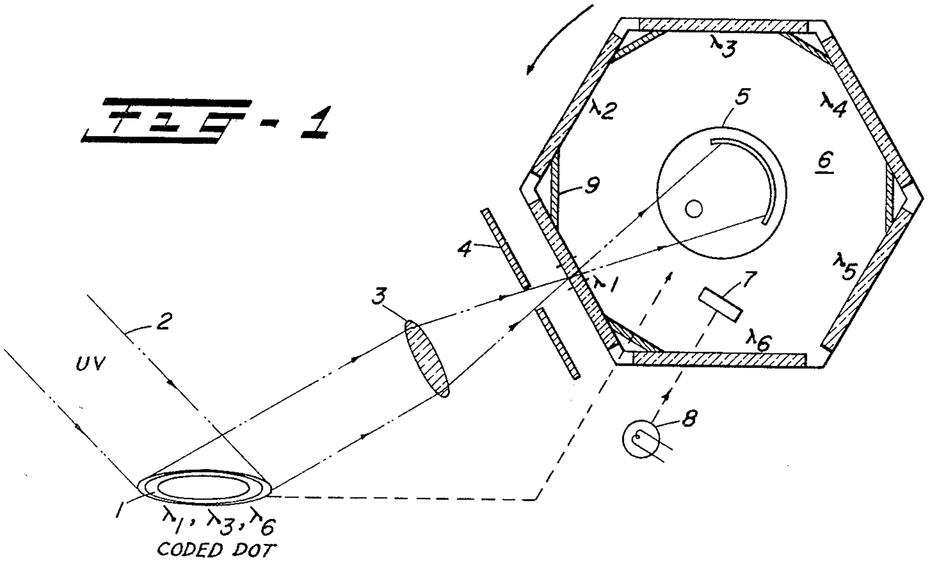
FIG. 1 is a section in semidiagrammatic form of the readout mechanism.

In the illustrated situation the coded dot 1 is assumed to have three of the six components of the coded ink present, which is symbolized by three fluorescent bands $\lambda_1$, $\lambda_3$ and $\lambda_6$. The fluorescent light from the coded symbol is then imaged by a lens 3 through stray light restricting aperatures 4 onto a photocell or photomultiplier tube 5. The beam passes through filters, $\lambda_1$ to $\lambda_6$, which are shown as on the outside of a rotating drum. In FIG. 1 the instant is represented where filter $\lambda_1$ is interposed in the beam. It should be understood that the illustration is semi-diagrammatic and is not to scale. Thus the coded dot is shown in exaggerated size while the light path to the photocell 5 is represented without exaggeration of path length of with much smaller exaggeration.

Inside the drum, which is represented generally as 6, there is located a second photocell 7 which at suitable intervals receives light from a visible light source 8. The drum filters are shown with light shields 9 across five of the six apices of the hexagonal drum, the filters $\lambda_1$ to $\lambda_6$ being shorter than drum face dimension. The sixth apex has no light shield and therefore once each revolution it passes a flash of light from the light 8 to the synchronizing photocell 7.

FIG. 1 shows the beam passing through filter $\lambda_1$ which, as is the case with the other five filters, is quite narrow and does not cover the whole of the drum side. The actual position of the light 8 and synchronizing photocell 7 are shown in solid lines, but the passage of the flash of light is shown from these two elements in dashed lines. Obviously this has occurred just before the position of the drum shown in FIG.1.

Figure 2:
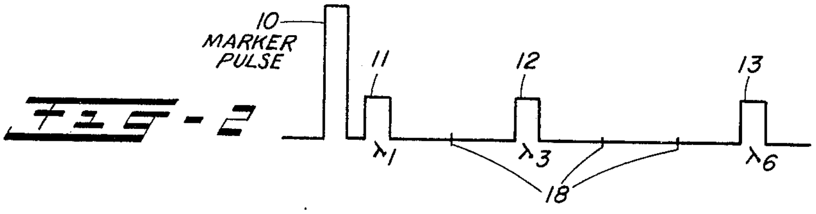
FIG. 2 represents a pulse train for a typical symbol.

FIG. 2 shows the pulse train output from one revolution of the drum, in the case of the coded symbol having components which fluoresce in the bands $\lambda_1$, $\lambda_3$ and $\lambda_6$. The flash of light on the cell 7 produces the pulse 10, which is of relatively much greater amplitude than the pulses 11, 12 and 13, which correspond to a signal from the photocell 5 through filters $\lambda_1$, $\lambda_3$ and $\lambda_6$ respectively. Had there been more components in the symbol there would be other pulses at the points marked by small lines 18 in the drawing.

FIG. 2 represents the signal as it comes from the photocells 5 and 7 which are connected in parallel. At the other five apices of the hexagonal drum of course the light shields 9 prevent any response from the photocell 7. As has been pointed out above, the invention really stops when the pulse train signal has been produced and the other electronic circuits which derive coded display or coded information therefrom do not form a part of the present invention and therefore are not shown.

The marker pulse 10 is for the purpose of showing the start of a particular symbol readout. The simple electro-optical method shown in FIG. 1 operates effectively and is a good illustration of this portion of the invention. However, of course, the invention is not limited to a sync pulse or other marker derived in this manner. For example, the rotating drum may have other means, such as a magnet passing a coil, to produce the necessary synchronizing pulse.

Ordinarily only a single pulse train should be produced for each coded symbol in order to prevent possible confusion. In other words, there should be a synchronization with drum rotation of the means for moving one symbol after another into the ultraviolet light beam. This is not shown in FIG. 1, which is semi-diagrammatic, and of course any suitable drive connection may be used. The connection is symbolized by the dashed lines from the drum axis to the coded symbols, which has the usual significance of a mechanical movement, in this case of course at the same rate as drum rotation.

Filter wheels and filter drums with single radiation detector are by far the simplest and cheapest forms of bringing successively different wavelength bands of fluorescent radiation from the symbol onto the detector. In its broadest aspect, however, the invention is not limited to this particular means of accomplishing the result, as it is also possible to use a prism, grating and the like which will successively image different bands on the detector. While operative these methods are more expensive and, therefore, while included in the broader aspects of the invention are not preferred.

Figure 3:
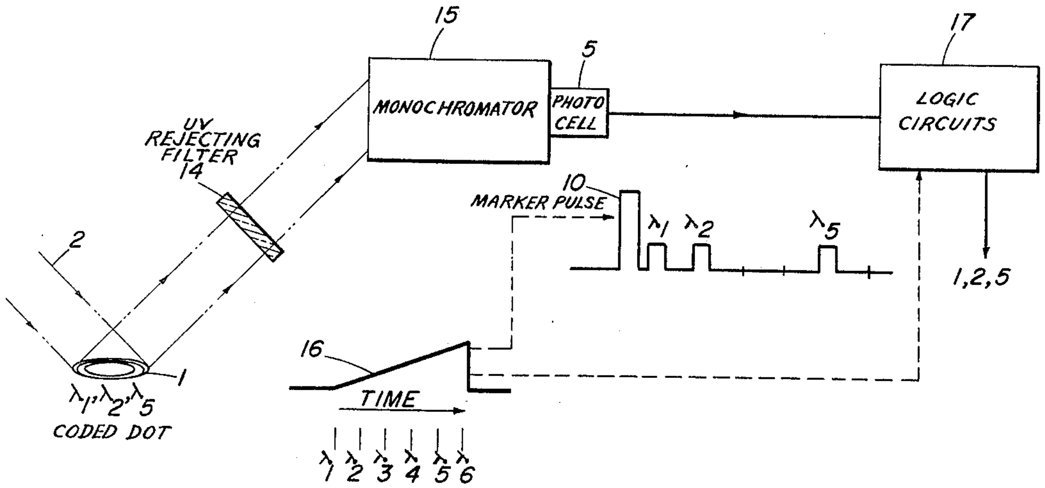
FIG. 3 is a diagrammatic representation of a modification of the invention using a monochromator.

FIG. 3, in which the same elements are given the same reference numerals as in FIGS. 1 and 2, shows the symbol 1 illuminated with ultraviolet light 2 exactly as in FIGS. 1 and 2 but there is now interposed in the beam from the fluorescing symbol 1 a filter 14 which rejects ultraviolet light but which passes longer wavelength radiation in the visible and/or near infrared which encompasses the fluorescing bands of all the components in the code. This light enters the input of a conventional monochromator 15 which is driven electrically by a triangular wave shown at 16 by a conventional means, such as piezoelectric, magnetostrictive, or other well known mechanisms for transforming electrical signals into mechanical movement. The amplitude should be sufficient to move the monochromator drive through a sufficient distance so that it includes all of the wavelength bands of all of the components in the coded system. As the drive can be quite rapid, it is usually preferable to employ monochromators with diffraction gratings rather than with prisms because of the lighter mass of the moving parts. Of course prism monochromators such as the well known Van Cittert type with fixed prisms, in which a small mirror is turned, may also be used. These monochromators are considerably heavier and larger than diffraction grating monochromators and therefore the latter are preferred.

The light passing out of the monochromator strikes the detector 5 and produces pulses exactly as shown in FIG. 2, where the different fluorescing bands were chosen by filters on a suitable filter wheel. FIG. 3 also shows that the output can go through conventional logic circuits 17 which will produce outputs showing the particular symbol. These circuits are conventional and of course would normally be used with the modification of FIGS. 1 and 2 also. Strictly speaking, as stated above, the present invention ends when the pulse trains are produced.

In the modification shown in FIG. 3 a timing or synchronizing pulse is derived from the drive of the monochromator, as is shown by the arrow to the synchronizing pulse 10; marking is exactly the same as in FIG. 2 where the synchronizing pulse was produced electro-optically from the second detector 7.

Ordinary logic circuits require some synchronization and this is shown diagrammatically in FIG. 3 by another arrow going from the electric driving signal 16 to the logic circuit 17.

FIG. 3 shows a modification which restricts somewhat the choice of coded ink components. In FIGS. 1 and 2 the fluorescent bands from the different components could overlap so long as there was at least one band for each component which is not produced by any of the others. In FIG. 3, where there are not separate, discrete filters, this is not desirable, and the fluorescent bands should not overlap, at least in the range covered by the detector 5. This means that normally most or all of the components should be narrow band fluorescers, such as the chelates of lanthanide ions. There should be no broad band fluorescers, such as organic compounds, typically diphenylanthracene or 4,5-diphenylimidazolone-2, both fluorescing in the blue, or at most there should be only a single one as otherwise problems of overlap arise and spurious signals can result. For example, if the broad band blue fluorescer had sufficient energy in the green, it might overlap the fluorescent band of a typical chelate of a lanthanide ion, such as a terbium chelate, and therefore there would be pulses from the broad band fluorescing component both in a position corresponding to the blue band through a monochromator and also in the green band. This can be distinguished amplitude-wise or by electrical means, but it is far preferable and simpler to have no overlapping fluorescent bands at all for the modification of FIG. 3. When this modification is used, it is therefore preferable to avoid coded components which have any overlap in their fluorescent wavelength bands.

FIG. 3 is essentially diagrammatic and it has shown the pulses as of the same width. If a number of narrow band fluorescers, such as chelated lanthanide ions, are used with one broader band fluorescer, such as diphenylanthracene, the pulse for the diphenylanthracene would be significantly broader than those for the components represented by chelated lanthanide ions. This does not interfere with the usefulness of the modifications of FIG. 3 too seriously, but logic or other readout circuitry is somewhat simplified if only narrow band fluorescers are used, and the pulse train shown in FIG. 3 is representative of such a situation.

I claim:

1. A readout mechanism for reading out symbols in coded inks in which the code involves the absence or presence in at least one concentration of photoluminescent components, each component luminescing in a wave-length band, at least part of which is not included in the band of luminescence of any other component, which comprises:

(a) means for illuminating the coded symbols with ultraviolet radiation, (b) a radiation detector responsive to the luminescent wavelengths of each component which are not shared by other components, said radiation detector transforming radiation into an electrical signal, (c) means for imaging the symbol onto the detector, (d) means for successively applying to said radiation detector the wavelength bands of each component which are not shared by the other components, (e) means for successively interposing filters in front of the detector, said means including a single transparent area to visible light, in which the filters are on the faces of a rotating filter wheel or filter drum, a separate detector and a source of visible light, the filter wheel or filter drum being provided with light shields except at one point consituting the transparent zone and permitting illumination of said second detector through said zone, (f) a source of visible light and a second detector, said light and detector producing an electrical signal of amplitude different from the signals from the detector receiving light through one of the filters, and (g) means for combining the output signals from both detectors whereby a pulse train is produced with the pulse from the second detector indicating the start of a filter interposition cycle.

References Cited

UNITED STATES PATENTS

| | | | |
|---|---|---|---|
| 3,059,112 | 10/1962 | Rogal | 250—71 |
| 3,160,697 | 12/1964 | Jacobs et al. | 356—100 X |
| 2,406,318 | 8/1946 | Brace | 350—315 X |
| 3,030,512 | 4/1962 | Harker | 250—71.5 X |
| 3,169,186 | 2/1965 | Howard | 250—71 |
| 3,196,393 | 7/1965 | Siegemund | 235—61.115 X |
| 3,289,172 | 11/1966 | Towle | 235—61.115 X |

RALPH G. NILSON, Primary Examiner

M. J. FROME, Assistant Examiner

U.S. Cl. X.R.

250—71.5, 83.3, 86; 350—315